(12) United States Patent
Tighe et al.

(10) Patent No.: US 8,271,893 B1
(45) Date of Patent: Sep. 18, 2012

(54) TRANSFORMING REPRESENTATION INFORMATION

(75) Inventors: Joseph Tighe, Chapel Hill, NC (US); Anmol Dhawan, Ghaziabad (IN); Richard Coencas, San Jose, CA (US); Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 828 days.

(21) Appl. No.: 12/351,792

(22) Filed: Jan. 9, 2009

(51) Int. Cl.
*G06F 3/00* (2006.01)
*G06F 3/048* (2006.01)

(52) U.S. Cl. ......... 715/765; 715/810; 715/835; 345/619

(58) Field of Classification Search .................. 715/764, 715/765, 835, 838, 839, 866, 810, 964; 345/619, 345/660, 661, 666; 700/117, 182
See application file for complete search history.

(56) References Cited

U.S. PATENT DOCUMENTS

| | | | |
|---|---|---|---|
| 2005/0012474 A1* | 1/2005 | Belliveau | 315/294 |
| 2008/0276178 A1* | 11/2008 | Fadell et al. | 715/733 |
| 2009/0083115 A1* | 3/2009 | Pearson et al. | 705/9 |
| 2009/0147297 A1* | 6/2009 | Stevenson | 358/1.15 |

* cited by examiner

*Primary Examiner* — Xiomar L Bautista
(74) *Attorney, Agent, or Firm* — Fish & Richardson P.C.

(57) ABSTRACT

Among other disclosures, a method may include receiving a request to modify graphical data using a graphical tool, wherein the graphical data is associated with representation information, and the request indicates a visually depicted aspect of the graphical data, deriving an alteration of the representation information, based, at least in part, on the visually depicted aspect, and transforming the representation information based on the derived alteration.

28 Claims, 10 Drawing Sheets

TRANSFORMING REPRESENTATION INFORMATION

BACKGROUND

The present disclosure relates to transforming representation information.

Performing activities (e.g., adjustments, modifications, editing, etc.) related to graphical data is facilitated by image editors. Editors can provide a user interface through which a user interacts with the editor. Editors can include graphical tools that manipulate graphical data. The user interface can display the graphical data being edited as well as graphical tools available. A user can interact with the editor using a mouse, keyboard and other devices based on onscreen cursors (e.g., an arrow associated with movement of a mouse). Edited image files can include metadata in addition to graphical data. For example, metadata tags, conforming to the Exchangeable image file format (Exif) specification, can be embedded with image files, such as those based on the Joint Photographic Experts Group (JPEG) standard. Such metadata tags can include descriptive information, such as the geographic location at which a photograph was taken.

SUMMARY

This specification describes technologies relating to transforming representation information.

In general, one aspect of the subject matter described in this specification can be embodied in a method performed by a computer programmed to transform representation information. The method can include receiving a request to modify graphical data using a graphical tool, wherein the graphical data is associated with representation information, and the request indicates a visually depicted aspect of the graphical data; deriving an alteration of the representation information, based, at least in part, on the visually depicted aspect; and transforming the representation information based on the derived alteration.

These and other embodiments can optionally include one or more of the following features. Deriving can include deriving the alteration based on a parameter configured by an end user. The method can include displaying the visually depicted aspect and deriving the alteration can include determining a zoom level for the displaying. The derived alteration can include metadata describing the visually depicted aspect. Deriving can include creating a copy, as part of the representation information, of a portion of the graphical data based on the received request and deriving a graphical alteration of the copy. The deriving can include selecting the portion of the graphical data based on the received request, including a location, relative to the graphical data, of the received request and the visually depicted aspect. The selected portion can include the visually depicted aspect, a portion of the visually depicted aspect, or some or all of the graphical data except the visually depicted aspect. In some embodiments, the visually depicted aspect can be a representation of a physical object. In some embodiments, the visually depicted aspect can be an appearance attribute of the graphical data.

Particular embodiments of the invention can be implemented to realize one or more of the following advantages. Some implementations can enhance the viewing experience while graphical data, such as an image, is modified by a user. For example, in response to a user starting to modify an image, an application can zoom in on the portion of the image to be modified. Increased magnification can make editing easier and more accurate by allowing a user to see small details. In addition, magnification can assist users having visual impairments.

Certain implementations can also provide for easier image editing by reducing the steps needed to perform desired tasks. For example, a user wishing to modify an image can select a tool and begin applying changes. As part of some implementations, an application can select regions of graphical data such that tools only apply within the regions. In addition, a copy of the selected regions can be made in response to the user action. Making a copy can enable non-destructive editing, provide the option of reverting back to the original data, and allow adjustment of parameters of previously applied operations. By replacing several user steps with a single action, editing can be more efficient, saving user time and increasing productivity.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Figure 1:
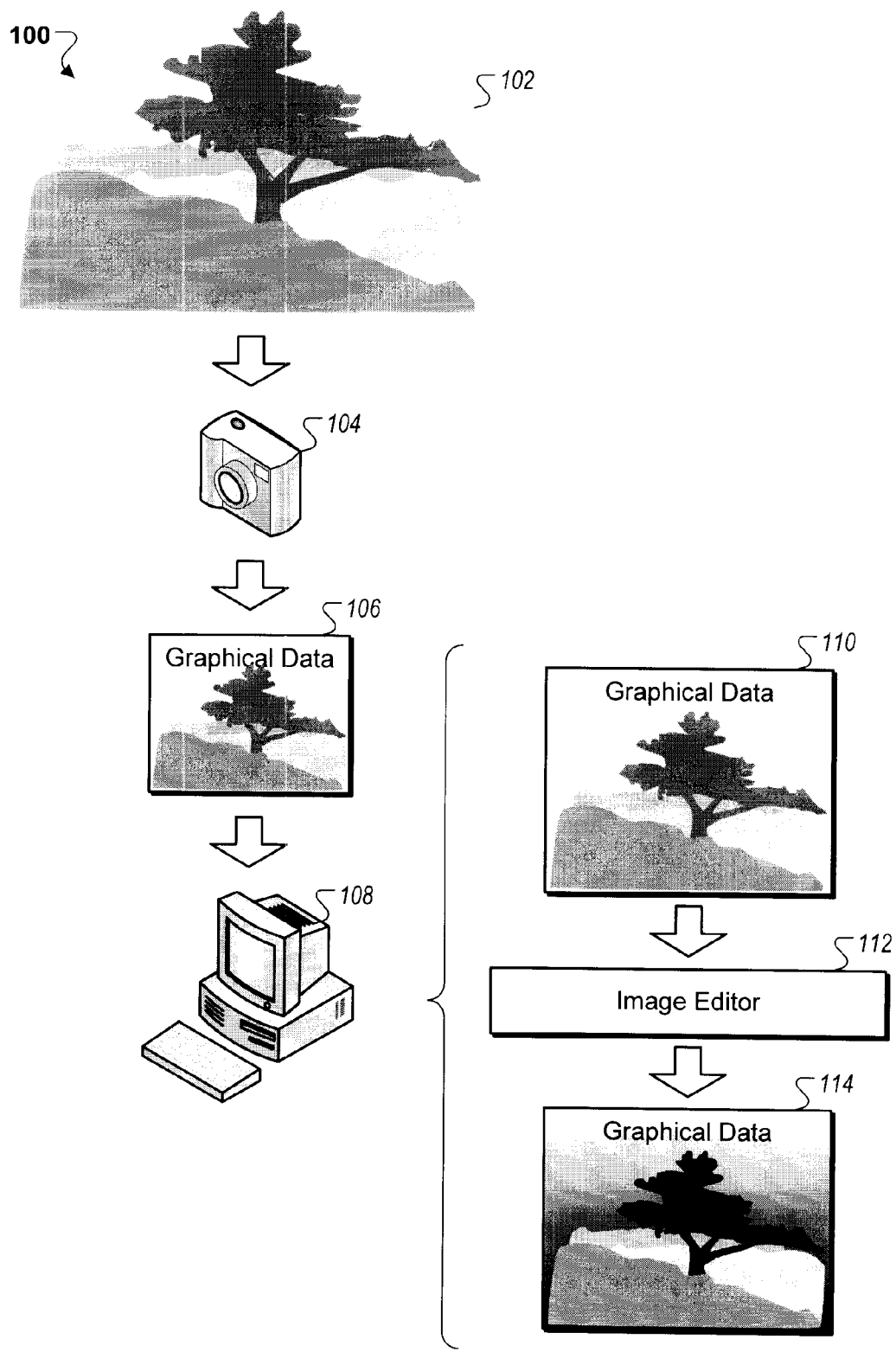
FIG. 1 is a conceptual diagram showing an example overview of editing graphical data.

FIG. 1 is a conceptual diagram 100 showing an example overview of editing graphical data. In general, graphical data can include photographs, such as of a person, animal or landscape. Graphical data can also include non-photographic graphics, such as buttons, banners, or text, or a combination of photographic and non-photographic elements. Once produced, graphical data can be loaded onto a computer and edited. Editing graphical data can include adding elements (e.g., additional photographic material), deleting portions of data (e.g., cropping or replacing data with a solid color), or making other adjustments (e.g., changes to contrast level, brightening, or replacing color families).

As shown in FIG. 1, a scenic landscape 102 can be photographed with a camera 104. Photographs can depict many types of subject matter, such as the landscape 102, people, cars, or commercial products. Cameras, such as the camera 104, can include digital cameras. A digital camera, sometimes referred to as a "digicam," can digitally take video, still photographs, or both using an electronic image sensor. Often thousands of images can be recorded on a single small memory device. Digital cameras are incorporated into many electronic devices ranging from personal digital assistants (PDAs) and mobile phones to vehicles.

Images are recorded as graphical data 106. The graphical data 106 can include data that represents the subject photographed. In addition, the data 106 can include metadata about the image, such as the date and time a photograph was taken. Often the graphical data 106 can be loaded on a computer 108 for viewing and editing. The computer 108 can include various mechanisms for receiving the graphical data 106 from the camera 104. For example, a Universal Serial Bus (USB) interface (not shown) can provide a mechanism by which the graphical data 106 from the camera is transferred to the computer 108.

On the computer 108, graphical data 110 can be stored independently from the camera 104, such as on a hard drive. On the computer 108, the graphical data 110 can be stored as a file in an operating system, and subsequently viewed or edited. The graphical data 110 can be stored using a form of compression, such as lossless or lossy compression, that reduces the storage space required for the data 110 (e.g., as with JPEG files). The graphical data 110 can also be stored without compression.

On the computer 108, an image editor 112, can be a software application capable of loading the graphical data 110, displaying the data 110, allowing a user to alter the data 110, and then save the modified graphical data 114. For example, the original image 110 can be washed out because of non-optimal lighting when the photograph was taken by the camera 104. In the image editor 112, the adverse lighting effects can be reduced or eliminated, using various graphical tools. As a result, a corrected image 114, which is more pleasing to the eye, can be created.

Figure 2:
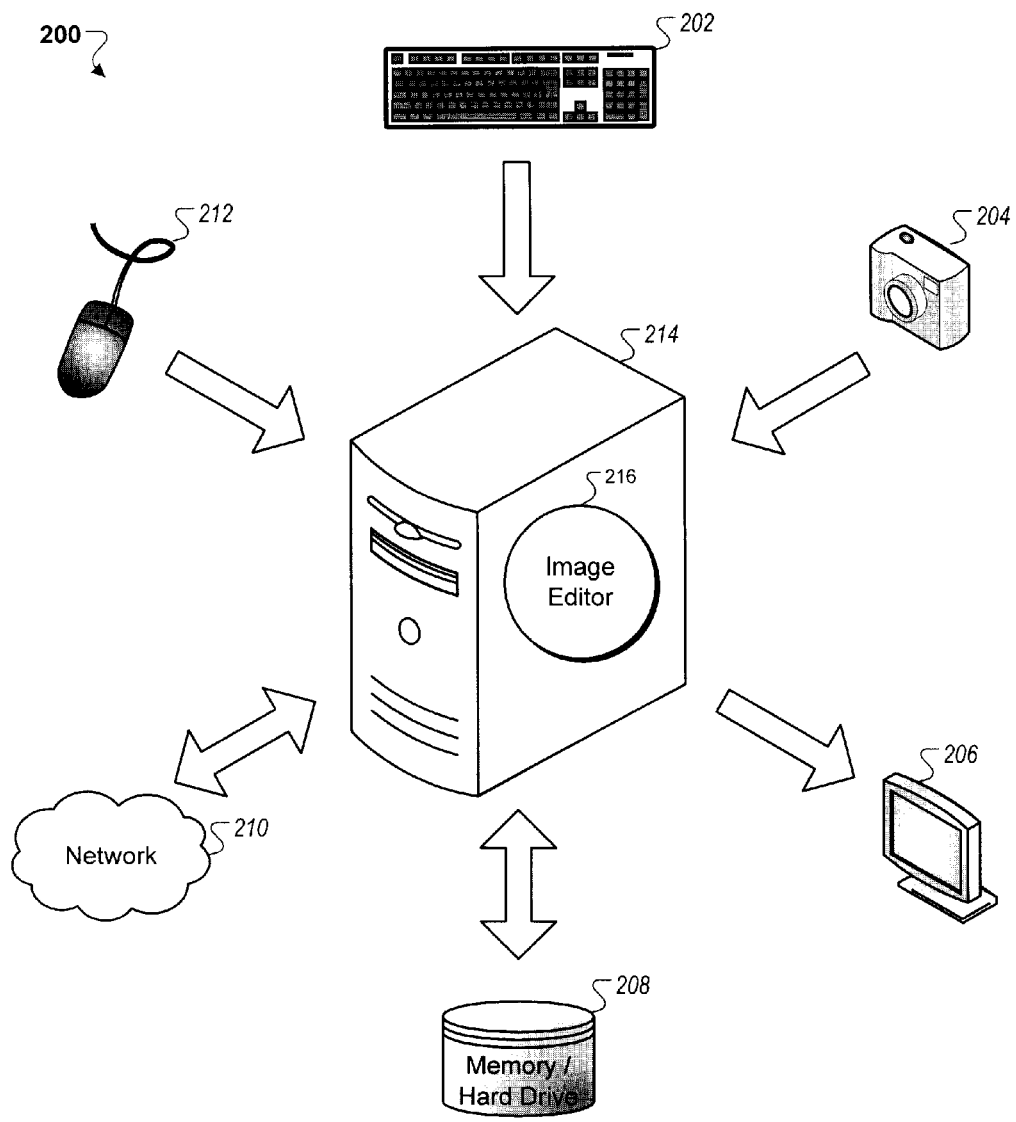
FIG. 2 is a system diagram showing exemplary interactions between a computer and components.

FIG. 2 is a system diagram 200 showing exemplary interactions between a computer and components. The computer 214 can enable software applications to run providing varied functionality. The computer 214 can be attached to various components allowing for input and output of data as well as interaction with the data.

As shown in FIG. 2, the computer 214 includes an image editor application 216. The editor 216 can run on the computer 214 and receive input from components or provide output to the components via the computer 214. The computer 214 can include memory and a processor (not shown) enabling applications, such as the editor 216, to execute.

When using the image editor 216, a user can control the editor using input devices, such as a mouse 212 or keyboard 202. Other devices through which a user can control operations of the editor 216 include touch screens, light pens, trackballs and graphics tablets. Using the mouse 212, or other pointing device, a user can control the onscreen movements of a cursor. The cursor can be used to interact with a graphical user interface of the image editor 216.

Using the keyboard 202, a user can input text into the editor 216 to be represented by the graphical data (e.g., a copyright notice or photographer attribution). The keyboard 202 can also be used to perform keyboard shortcuts, such as selecting a menu item or graphical tool. A shortcut can oftentimes achieve the same functionality as several steps using the mouse 212. For example, a keyboard shortcut can select the same command as clicking on a menu name to open the menu, and then clicking on an item within the menu.

The computer 214 can also be connected to a camera 204 using, for example, a USB or Institute of Electrical and Electronics Engineers (IEEE) standard 1394 (e.g., FireWire, i.Link, or Lynx) interface. Graphical data, such as photographs, can be transferred from storage in the camera 204 to the computer 214, and then opened and modified in the image editor 216.

The computer 214 can include a display 206 enabling a user to see or otherwise perceive (e.g., through touch as with a Braille terminal) output from the computer 214. The output shown on the display 206 can reflect input by the user, such as the movement of a cursor by a mouse 212, or requests to modify the graphical data by the user using the image editor 216.

The computer 214 can include access to electronic storage 208, such as memory or a hard drive. Many computers include a hard drive. However, a hard drive can also be external to the computer 214. In addition, the computer 214 can be connected to electronic storage 208 that is located remotely from the computer 214. In addition, when the image editor 216 loads an image from a hard drive, the image can be fully or partially loaded in volatile electronic storage 208 (e.g., random-access memory [RAM]). Often such electronic storage 208 provides improved performance to the image editor 216 during operations on the data which can then be saved to non-volatile electronic storage 208.

The computer 214 can also include an interface to a network 210, such as the Internet or a corporate wide area network (WAN). The image editor 216, through the computer's interface with the network 210, can store graphical data remotely in electronic storage 208. The editor 216 can also request and receive updates or additions to its software. A user can share graphical data, using the image editor 216, with others on the network 210.

Figure 3:
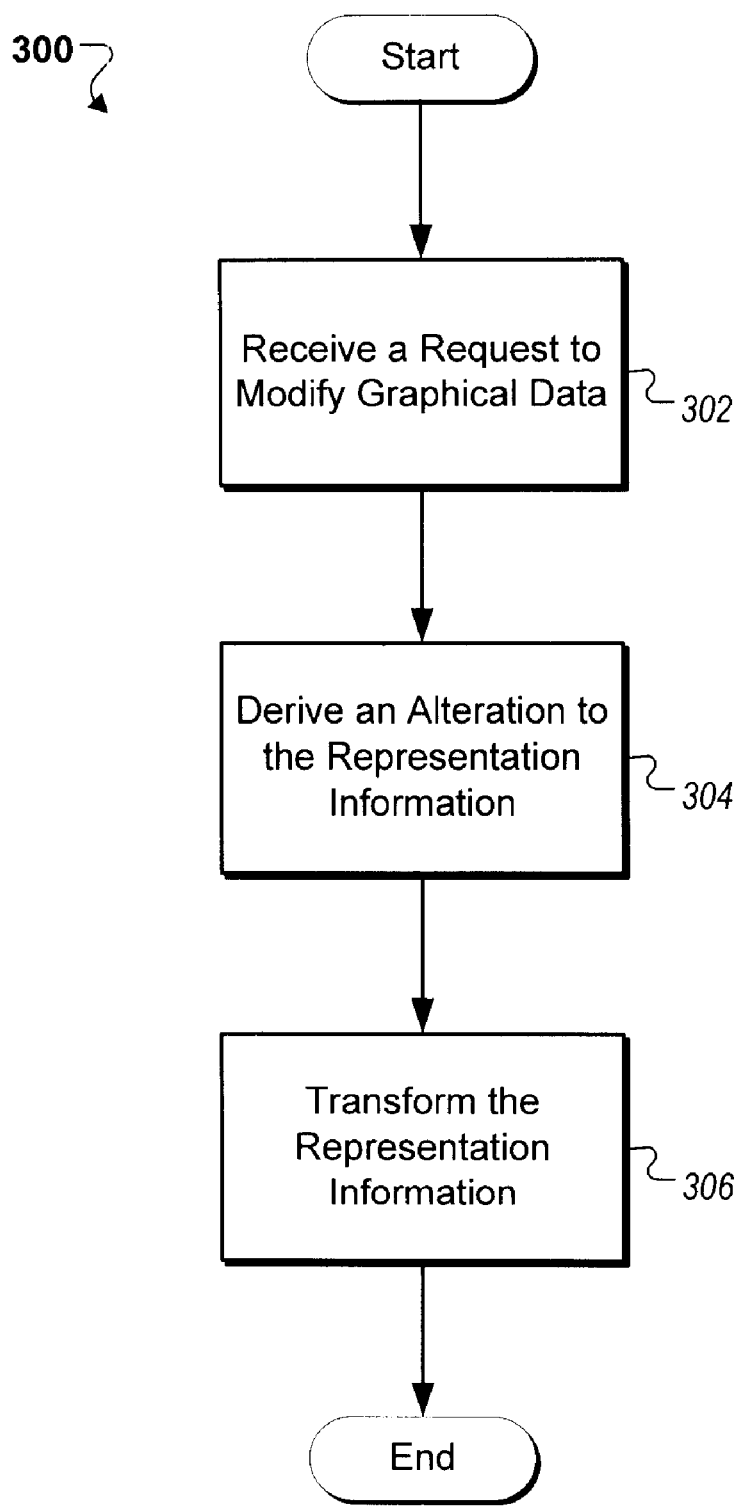
FIG. 3 is a flow diagram showing an example process for transforming representation information.

FIG. 3 is a flow diagram showing an example process 300 for transforming representation information. When interacting with an image editor various tasks performed by the editor can facilitate the editing environment for the user. For example, when an editor selects a mouth tool, for editing mouths in photos, such as to add lipstick or whiten teeth, the editor can zoom in on the mouth to a level generally appropriate for such editing. Automatically zooming for the user, based on information known about what the user is doing, can eliminate extra steps in the editing process (e.g., having to select an appropriate zoom level) improving the efficiency and effectiveness of the editing experience.

As shown in FIG. 3, the process 300, at 302, receives input: a request to modify graphical data. The request can be a graphical operation. When the request is received, the process 300 can assess that a graphical tool is selected (i.e., active) and apply the tool. For example, a user can use a mouse to select a brush tool (e.g., by click on an icon representing the brush tool). The user can then, using the mouse cursor, click on an area of graphical data indicating the brush tool should be applied to the location.

The process 300, at 304, uses the input, given the context in which it is received, to derive alterations, not of the graphical data, but of representation information for the graphical data. By using information about the selected tool, the process 300 can alter representation information in a beneficial manner. For example, a user can select a tree tool, and then click on the graphical data using the tool. Applying the tool can indicate a tree is included in the image and the process 300, at 304, can derive corresponding alterations to representation information.

Representation information is information relating to the representation of graphical data. Representation information can include information on how the data is displayed (e.g., a zoom level), data associated with the graphical data (e.g., metadata), and graphical data relating to the original graphical data produced in response to a request (e.g., by the process 300, at 302). For example, the related graphical data can be a layer and include a copy of a portion of the graphical data.

The process 300, at 306, actually transforms the context relating to the graphical data to provide an enhanced editing experience. The process 300 accomplishes the transformation by transforming the representation information. For example, the process 300 can add metadata to the graphical data stored in a file so that the metadata is subsequently available in association with file. As a result, an image editor can automatically organize photos using the metadata. An online photo sharing application or search tools can also beneficially use the metadata information to make the image data more accessible.

In addition, at 306, the process 300 can modify a copy of part of the graphical data using a graphical operation. For example, the copy can be brightened, yet the original graphical data remains unchanged. Modifying the copy of the graphical data can provide a safe editing experience because original graphical data is unchanged. Such an experience can encourage a user to experiment more freely.

Performing operations on a copy can also make subsequent changes to the operations easier. For example, creating a copy can permit a user to undo a change even after an image editor application has been closed. Image editors can include an undo command to reverse changes made. However, once an image editor is closed, the memory of the undo commands can be, and generally is, lost. Advantageously, by performing an operation on a copy of graphical data, the copy can be saved to disk in association with the original graphical data. After closing and reopening the editor, the original data and the saved copy can be loaded allowing further adjustments to the previously performed graphical operation, based on the copy. Also, previous adjustments can be undone, based on the original graphical data.

An image editor, embodying the process 300, can provide for an enhanced editing experience without a user necessarily being aware of the underlying implementation details. For example, at 306, the process 300 can add descriptive metadata to a graphical data file. Even though the user is not aware the metadata was added, images can be automatically categorized or retrieved in response to a search based on the metadata. The process 300 thus can provide beneficial results even though a user is unaware the operations of the process 300 are even occurring.

Alternatively, when the process 300, at 306, modifies representation information, a user can immediately see the result. For example, representation information can include the zoom level of a portion of graphical data. Modifying the zoom level, such as to zoom in on the portion, can be readily noticed.

Figure 4:
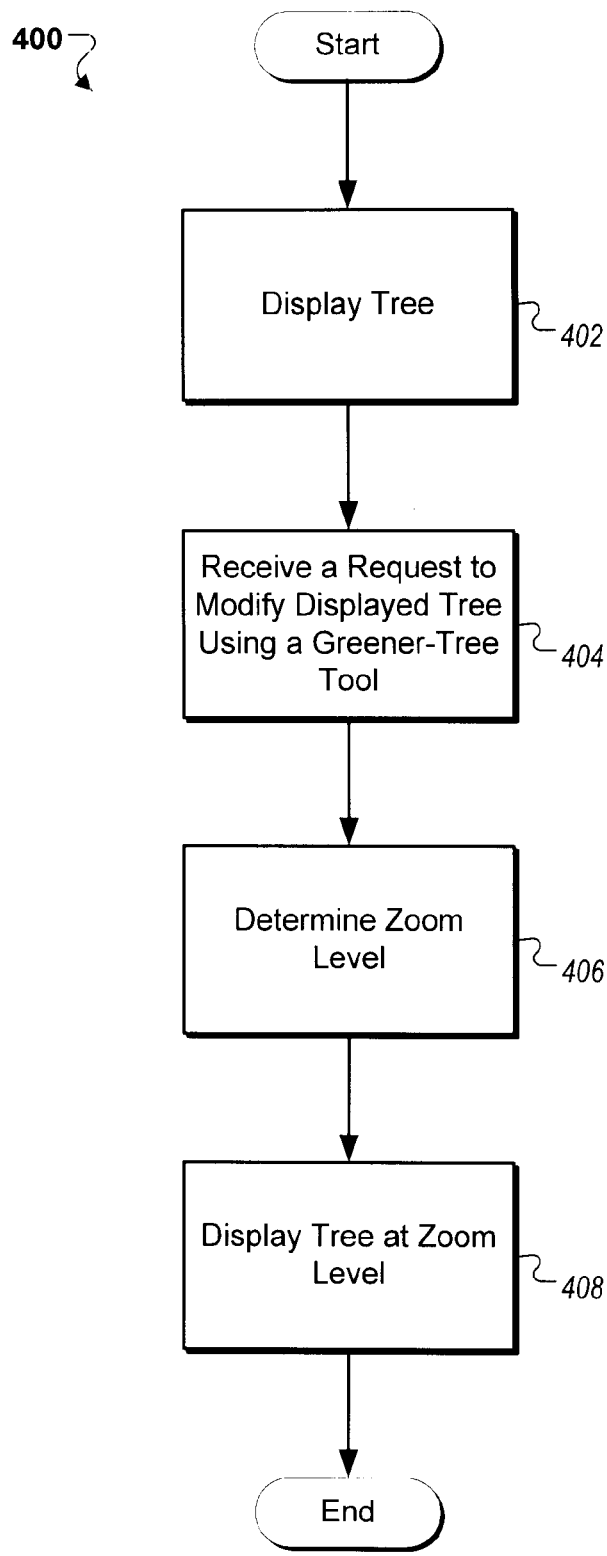
FIG. 4 is a flow diagram showing an example process for transforming representation information.

FIG. 4 is a flow diagram showing an example process 400 for transforming representation information. The process 400 relates to changing zoom levels relative to graphical data based on what is represented by the graphical data.

As shown in FIG. 4, the process 400, at 402, displays graphical data including a tree representation. For example, the graphical data may be a photograph representing various physical objects including a tree. The tree representation can be less green in appearance than the actual tree of which the photograph was taken, or otherwise unsatisfactory to the user.

The process 400, at 404, can receive a request to modify the displayed tree using a greener-tree tool, as a result. Through the request, the process 400 can receive an indication that the graphical data includes a tree. The request can originate with a tool, such as the tree tool 806, in FIG. 8. The process 400 can also receive location information with the request providing the location in the graphical data of the tree. The process 400 can also have information about the level of zoom at which the tree is currently being displayed.

The process 400, at 406, can determine an appropriate level of zoom for modifying the tree. The appropriate level of zoom can be predefined based on the typical size of trees in photographs or settings configured by a user. For example, a user who frequently edits tree representations may associate a 300% (3×) zoom level with a tree tool. Alternatively, the process 400, can determine the appropriate level by analyzing the location associated with the request and the graphical data in close proximity to that location (e.g., data within a circular region centered on the location and having a radius equal to 10% of the image length or width). Applying algorithms, the process 400, at 406, can determine the zoom level based on the actual size of the tree.

For example, a display can have a resolution of 3,360 by 2,100 pixels. Within the display, an editing window can occupy the entire screen. An image being edited can have a size of 1,280 by 1,024 pixels. When a user clicks on the image when a greener-tree tool is selected, the process 400, at 406, can analyze the graphical data around where the click occurred (e.g., dynamically adjusting the area to be analyzed based on characteristics of the graphical data) and determine that the colors represented by the graphical data are consistent with tree representations. Furthermore, the process 400, at 406, can assess, based on the color variation and the click, that the tree representation is approximately 350 by 900 pixels. The process 400, at 406, can ascertain the boundaries of the tree. The process 400, at 406, can determine that users generally want to modify trees at the maximum zoom level possible. The process 400, at 406, can also determine that the tree will fit in the editing window with a zoom level of 230% (2.3×).

Continuing the example, using the zoom level determination, the process 400, at 408, can display the tree with a 230% (2.3×) zoom level. As a result, the process 400, at 408, can display the tree magnified to a size of 805 by 2,070 pixels. Displayed at the higher zoom level, the tree can be much easier to edit since small details are enlarged. Editing can also be more precise with improved visibility.

Following the same example, the process 400, at 406, can alternatively determine, based on predetermined settings, that displaying a 400 by 1,000 rectangle centered on the click location, at a zoom level of 200% (2×) will generally provide satisfactory results. The process 400, at 408, can display the portion of the image at 200% (2×), also providing improved editing capability. Default predetermined settings can be included with a commercial software package or be configured by a user.

Figure 5:
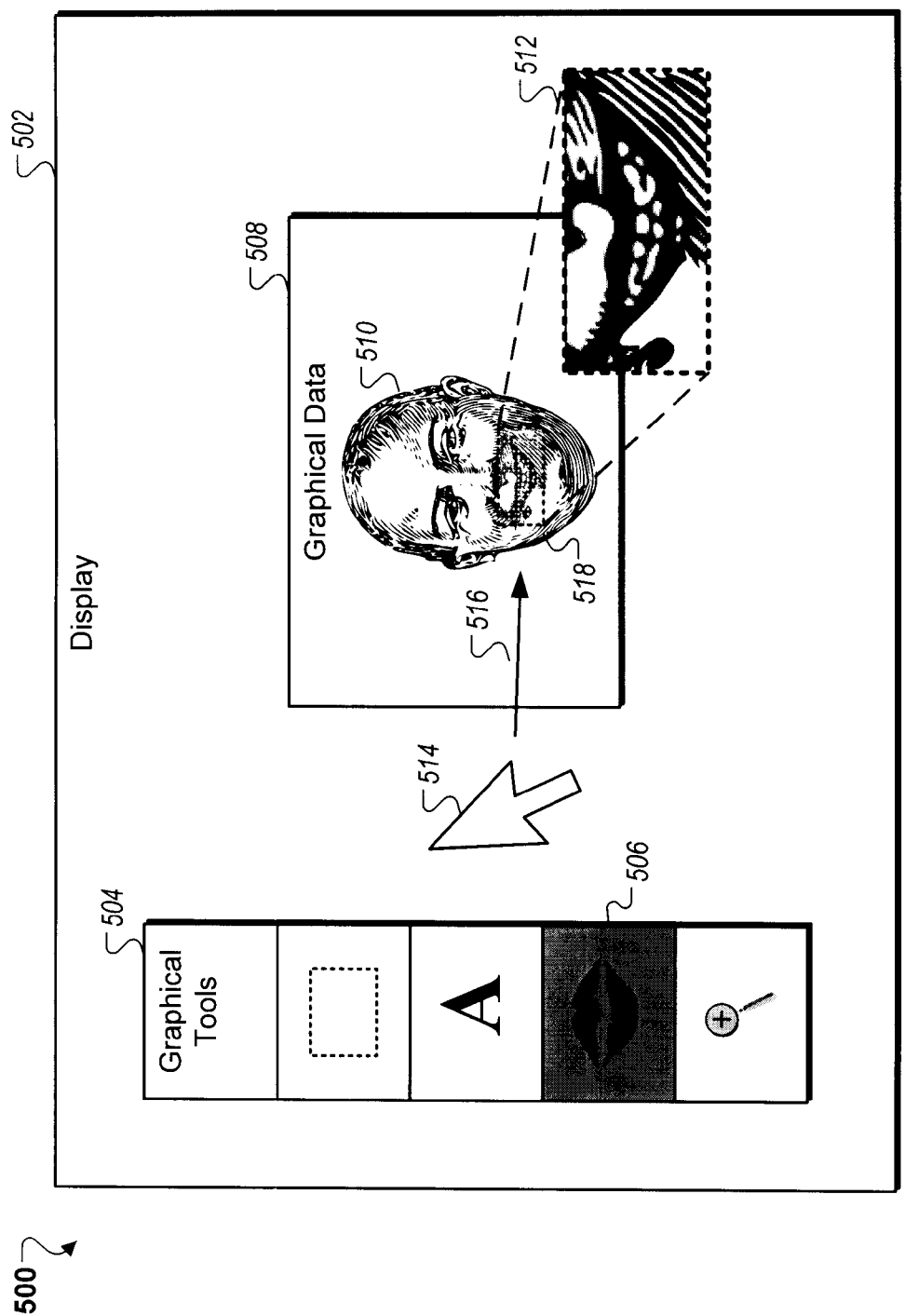
FIG. 5 is a block diagram showing an example display in which representation information is transformed.

FIG. 5 is a block diagram 500 showing an example display 502 in which representation information is transformed. The diagram 500 can be an exemplary result of the process 400, in FIG. 4, described above. In general, diagram 500 shows how representation information can be transformed when the representation information includes a zoom level relating to the display of a visually depicted aspect in graphical data.

The display 502 includes graphical data 508 and a menu 504 of graphical tools. The display 502 can be a computer screen displaying visual information. The graphical data 508 can be a visual representation of binary data loaded from an electronic storage device (e.g., a hard drive). In the example display 502, the graphical data 508 includes a representation of a smiling man 510. The graphical data 508 can, alternatively, include many other representations such as people, electronic devices, landscapes, textual graphics, etc.

The menu 504 can provide a mechanism by which a user can select a graphical tool, such as the mouth tool 506, to use in editing the graphical data 508. Graphical tools can include tools for selecting regions of the graphical data 508, as well as tools for performing operations on the graphical data 508. Tool options can be provided through an interface such as menu 504 including icons representing the function of the tool. Tool options can also be provided through other mechanisms, such as through textual-based menus appearing horizontally across the top of an editing window.

The display 502 can also include a cursor 514 which responds to movements of a mouse or trackball, or keystrokes on a keyboard. Using the cursor 514, a user can select one of the tools from menu 504. From example, on menu 504, the mouth tool 506 can be selected. That the mouth tool 506 is selected can be indicated visually, such as by the background for the tool icon being a different color than the backgrounds of non-selected tools.

Having selected a tool 506, a user can then apply the tool to the graphical data 508. Using the cursor 514 (e.g., with a mouse), a user can click on a region of the graphical data to apply the tool, as represented by the arrow 516. For example, a user can click on the mouth of the man 510 represented in the graphical data 508. The image editor can determine from the tool 506 being selected and applied, that the graphical data 508 includes a mouth. In response, a region 518 of the graphical data, containing the mouth, can be displayed at a higher zoom level 512. The increased zoom level 512 of the region 518 can provide for easier editing, especially given a mouth can have many details and be a relatively small part of an overall image.

In addition to a mouth tool 506, various other tools can operate similarly. For example, the mouth tool 506 can be a lipstick tool designed to assist in editing lips to appear as though they are wearing lipstick, additional lipstick or a different shade of lipstick. The mouth tool 506 can be a teeth-whitening tool, assisting users to make teeth appear less yellow. Other tools can include a bluer-sky tool, a greener-tree tool, a skin-blemish-remover tool, and a face-blur tool (for making a face representation unrecognizable).

Figure 6:
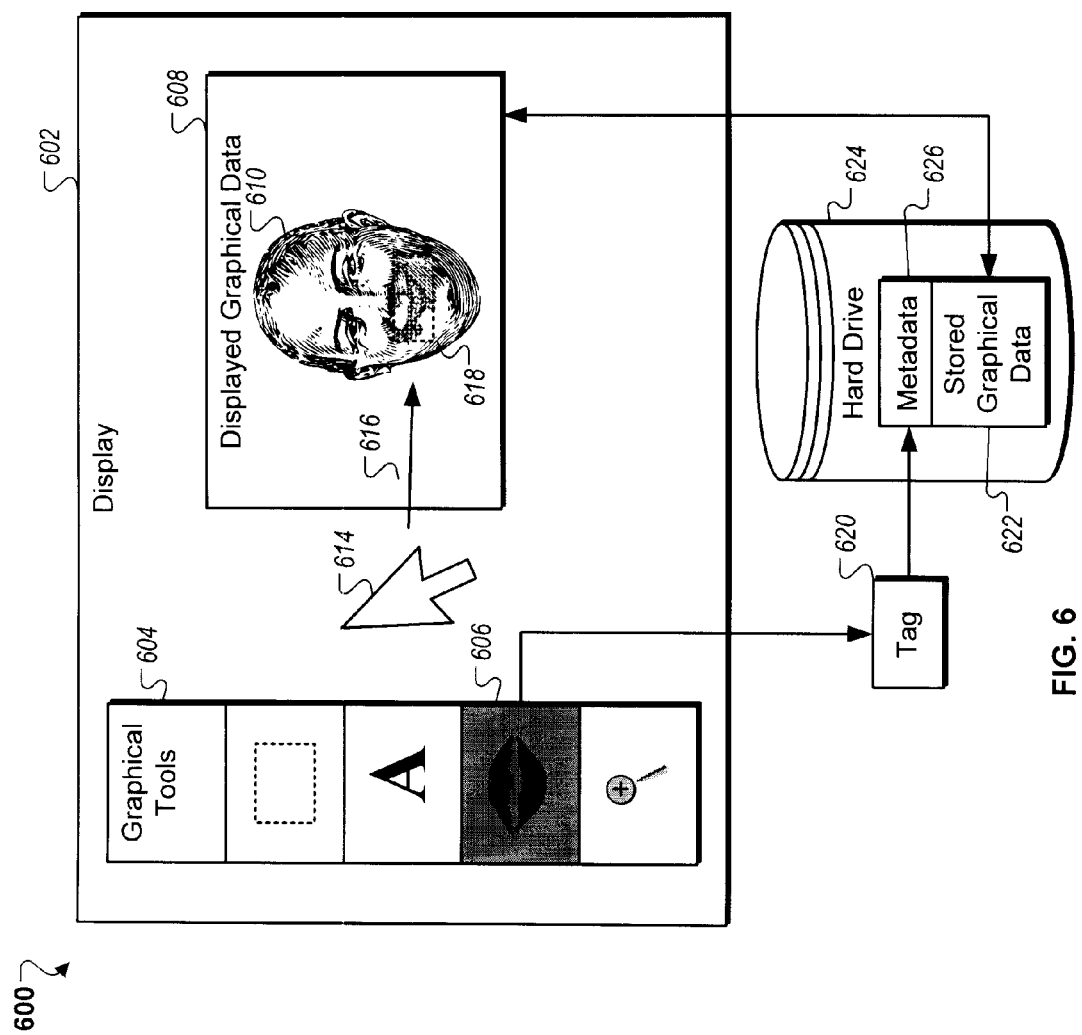
FIG. 6 is a block diagram showing an example display in which representation information is transformed.

FIG. 6 is a block diagram 600 showing an example display 602 in which representation information is transformed. In general, diagram 600 shows how representation information can be transformed when the representation information includes metadata relating to graphical data.

As shown in FIG. 6, the display 602 includes displayed graphical data 608 and a menu 604 of graphical tools. The displayed graphical data 608 can be a visual representation of binary data, such as stored graphical data 622. The stored graphical data 622 can be stored on a hard drive 624 and loaded as displayed graphical data 608. Furthermore, the stored graphical data 622 can be modified based on interactions with the displayed graphical data 608. In the example display 602, the displayed graphical data 608 includes a representation of a smiling man 610.

Through a menu 604, a user can select a graphical tool, such as the mouth tool 606, to use in editing the displayed graphical data 608. Graphical tools can include tools for selecting regions of the displayed graphical data 608, as well as tools for performing operations on the displayed graphical data 608. Tool options can be provided through an interface such as menu 604 including icons representing the function of the tool. Tool options can also be provided, e.g., through textual-based menus appearing horizontally across the top of an editing window.

The display 602 can also include a cursor 614 which responds to movements, e.g., of a mouse. Using the cursor 614, a user can select one of the tools from menu 604. For example, on menu 604, the mouth tool 606 can be selected. That the mouth tool 606 is selected can be indicated visually, such as by the background for the tool icon being a different color than the backgrounds of non-selected tools.

Having selected a tool 606, a user can then apply the tool to the displayed graphical data 608. Using the cursor 614, a user can click on a region 618 of the graphical data to apply the tool, as represented by the arrow 616. For example, a user can click on the mouth of the man 610 represented in the displayed graphical data 608. The image editor can determine from the tool 606 being selected and applied, that the displayed graphical data 608 includes a mouth in the region 618. In response, a tag 620 associated with the mouth tool 606 can be added to the metadata 626 associated with the stored graphical data 622. The tag 620 can be metadata indicating that the stored graphical data 622 includes a representation of a mouth. Multiple metadata tags, such as the tag 620, can be associated with a tool. For example, inferences can be made based on use of the mouth tool 606, that the stored graphical data 622 also includes representations of teeth, lips, a face, a head, and a person. An editor can determine, based on the application of the mouth tool 606, the descriptive metadata reflecting these inferences to add to the metadata 626 associated with the stored graphical data 622.

Figure 7:
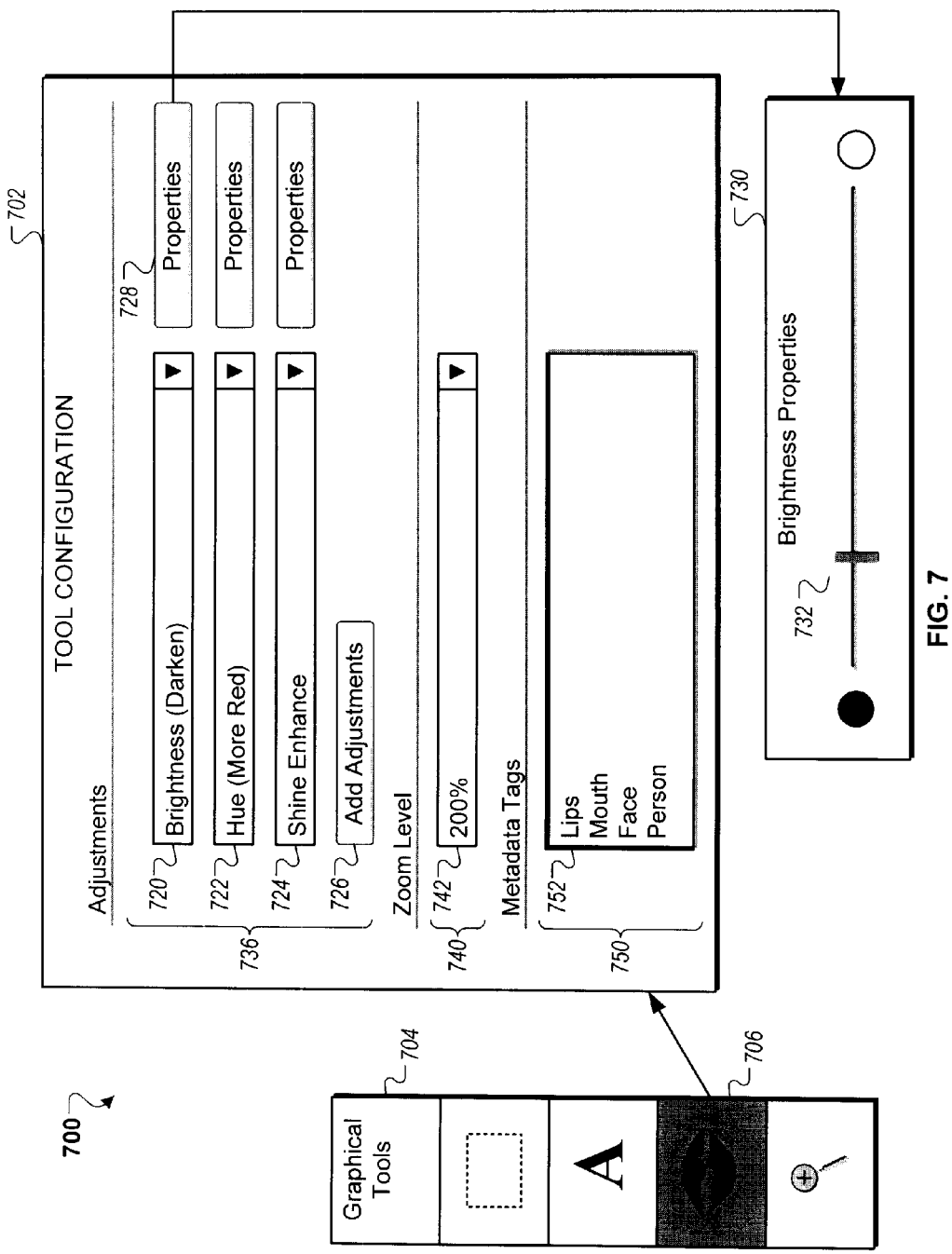
FIG. 7 is a block diagram showing an example interface for configuring a preset tool.

FIG. 7 is a block diagram 700 showing an example interface 702 for configuring a preset tool 706. In general, a preset tool 706 can be a tool for applying a predetermined set of operations to representation information. The predetermined set can be included with commercial software and then configured by a user. In addition, a user can create a tool and determine the operations to be applied with the tool. A user interface can be provided for creating and configuring preset tools. Alternatively, or in addition, a user can modify or create configuration files (e.g., XML files) on which a preset tool is based.

As shown in FIG. 7, the preset tool 706 can be selected by the user through a toolbar 704. In addition, a user can select preset tools through menus, fly-out toolbars, and through keyboard shortcuts. The toolbar 704 can be configured to only provide access to tools included with commercial software. The toolbar 704 can also provide access to included tools which have been configured by the user. For example, a lipstick tool 706 can be included with commercial software. If the tool's 706 configuration is changed, selecting the tool 706 through the toolbar 704 can result in the changed tool being applied.

Additionally, an image editor can provide further configurability. For example, an image editor can provide sub or fly-out toolbars relative to the toolbar 704 for selecting a variation of a tool 706, such as versions included with the software and user-created versions. A commercial software product may include a lipstick tool with pink, bright red, and dark red variations. A user might then create black and brown variations. Furthermore, an image editor can provide the ability for a user to add new tools to the toolbar 704 and supply an icon to display on the toolbar 704 relative to the tool.

The interface 702 can be opened by the user relative to a preset tool 706 on the toolbar 704. The interface 702 can be opened through the toolbar 704 (e.g., by pressing the Ctrl key while clicking on a tool). The interface 702 can also be opened through menus (e.g., through a Tools menu and Properties submenu).

The interface 702 shows an example of configuring parameters, for transforming representation information, associated with a preset tool 706. In the example interface 702, a user can configure three types of parameters: graphical adjustments 736, a zoom level 740, and metadata tags 750. When the tool 706 is applied, representation information can be transformed based on the settings in the interface 702. For example, multiple graphical adjustments can be applied to a copy of a portion of graphical data, the zoom level at which some aspect of graphical data is displayed can be changed, and metadata tags can be added to an image file's metadata.

As shown in the adjustments section 736, a user can select a graphical operation from a dropdown menu 720, such as a brightness operation. By clicking on the associated properties button 728, the user can be given additional configuration options relating to the operation selected. Through the interface 730 a user can select properties of the brightness operation using a slider 732, such as selecting whether the operation should brighten or darken. The preset tool 706 can also apply additional operations such as a hue adjustment, as selected with the dropdown 722, and shine enhancement, as selected with the dropdown 724.

Through the interface 702, a variable number of operations can be associated with the preset tool 706. In some situations, no graphical adjustment may be wanted (e.g., a user simply wants a convenient way to appropriately set a zoom level and add metadata tags). In that case, the user can set each of the dropdowns 720, 722 and 724 to, e.g., "No adjustment selected" (not shown). Moreover, if a user wants more than three graphical adjustments, the user can click on the Add Adjustments button 726. Additional interface screens can facilitate configuration of the additional adjustments.

As shown in the zoom level section 740, a user can select a zoom level from a dropdown menu 742 to be used when a tool 706 is initially applied. For example, when working on a mouth, such as to apply lipstick, a zoom level of 200% (i.e., 2×) may be appropriate. The dropdown menu 742 can include many zoom level options including to zoom out (e.g., 50% or 0.5×). Some types of editing can require very high zoom levels (e.g., editing eyes) and a zoom level of 1600% (16×) or higher may be appropriate.

As shown in the metadata tags section 750, a user can type metadata tags into a text area 752 to be added to an image file when the tool 706 is applied. Thus, for example, a user can personalize a tool 706 so that names of people or places are added to an image's metadata based on a user's particular user of the tool 706. General metadata tags can also be added based on inferences derived from the tool 706 used. For example, a tree tool may have associated metadata tags such as "tree," "leaves," "outdoors," and "green." Even if the metadata added as a result of applying the tool 706 is not perfectly accurate all the time, the metadata can often be accurate. As a result of supplementing image metadata, access to and organization of images can be greatly enhanced.

Through a preset tool 706 a user can efficiently apply a set of operations to representation information. Consequently, a user can avoid having to apply several often repeated operations one by one.

When a preset tool 706 is directed to a type of graphical subject matter, visual implications of the subject matter can allow for a coherent set of operations to be selected. For example, the preset tool 706 can be a lipstick tool specialized to make lips to which it is applied appear to have lipstick. By knowing the type of use to which the tool 706 will be placed (e.g., to lips), the types of corrections implied by the use can be setup in advance (e.g., by a creator of software or a software user).

Figure 8:
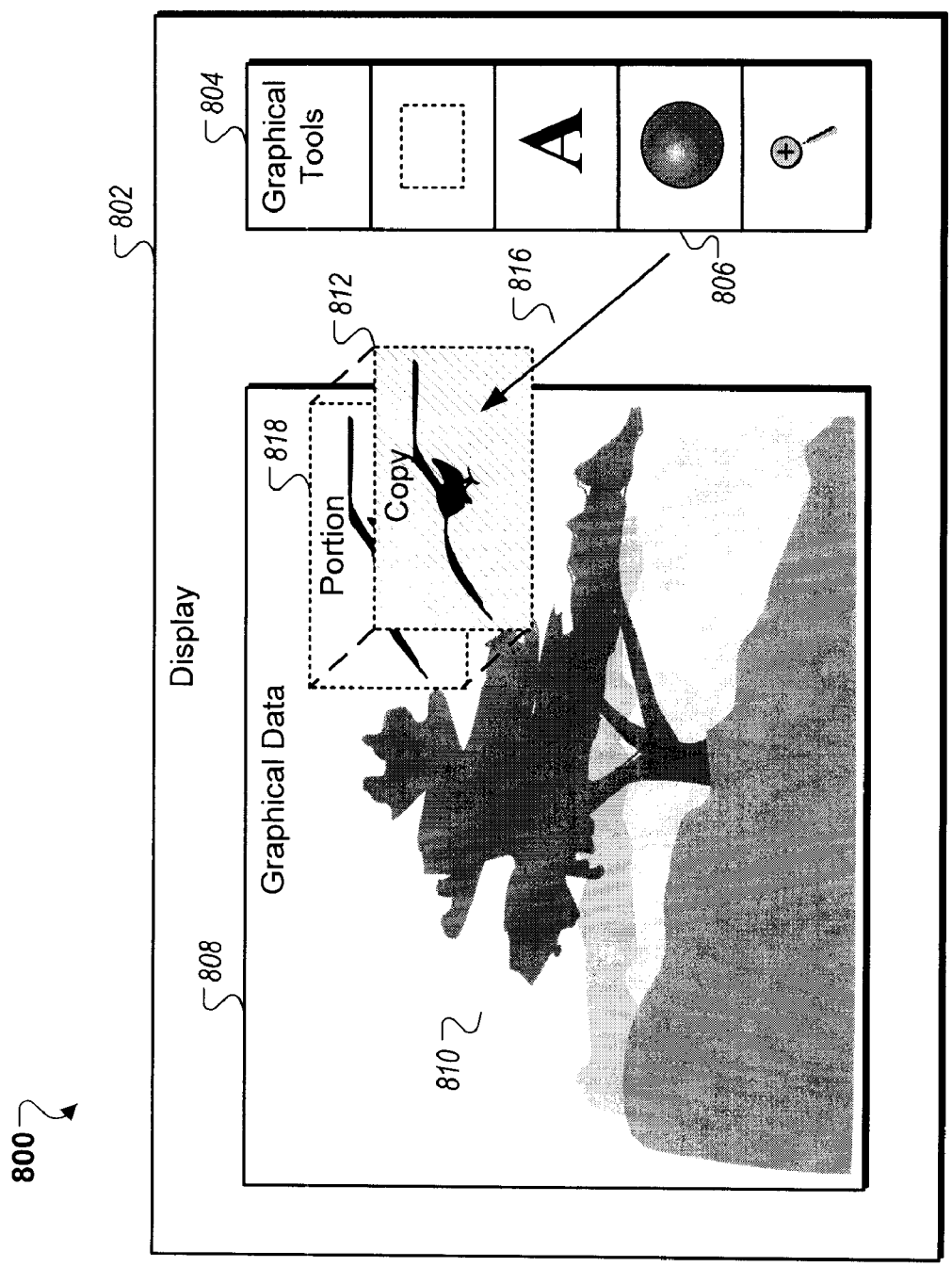
FIG. 8 is a block diagram showing an example display in which representation information is transformed.

FIG. 8 is a block diagram 800 showing an example display 802 in which representation information is transformed. In general, diagram 800 shows how representation information can be transformed when the representation information includes a copy 812 of a portion 818 of graphical data 808.

As shown in FIG. 8, the display 802 includes graphical data 808 and a menu 804 of graphical tools. In the example display 802, the graphical data 808 includes a representation of a landscape 810.

Through menu 804 a user can select a graphical tool, such as the brightness tool 806, to use in editing the graphical data 808. Graphical tools can include tools for selecting regions of the graphical data 808, as well as tools for performing operations on the graphical data 808.

Application of the brightness tool 806, as represented by the arrow 816, can indicate that the graphical data 808 includes an aspect needing graphical modification (e.g., changing the brightness). As a result of the anticipated graphical modification, a copy 812 of the portion 818 of the graphical data 808 to be modified can be made. The copy 812 of the graphical data 808 can be modified rather than the original, source portion 818. As such, the copy 812 can be deleted or subsequently readjusted, leaving the portion 818 and, more generally, the graphical data 808 unchanged.

As shown in FIG. 8, the copy 812 is overlaid on the portion 818 of the graphical data 808. Overlaying the copy 812 on the portion 818 can provide the appearance that the graphical data 808 has been modified. A user can therefore be unaware of the existence of the copy 812, thus helping to prevent distractions for users desiring a simplified editing experience and non-destructive editing capability.

Figure 9:
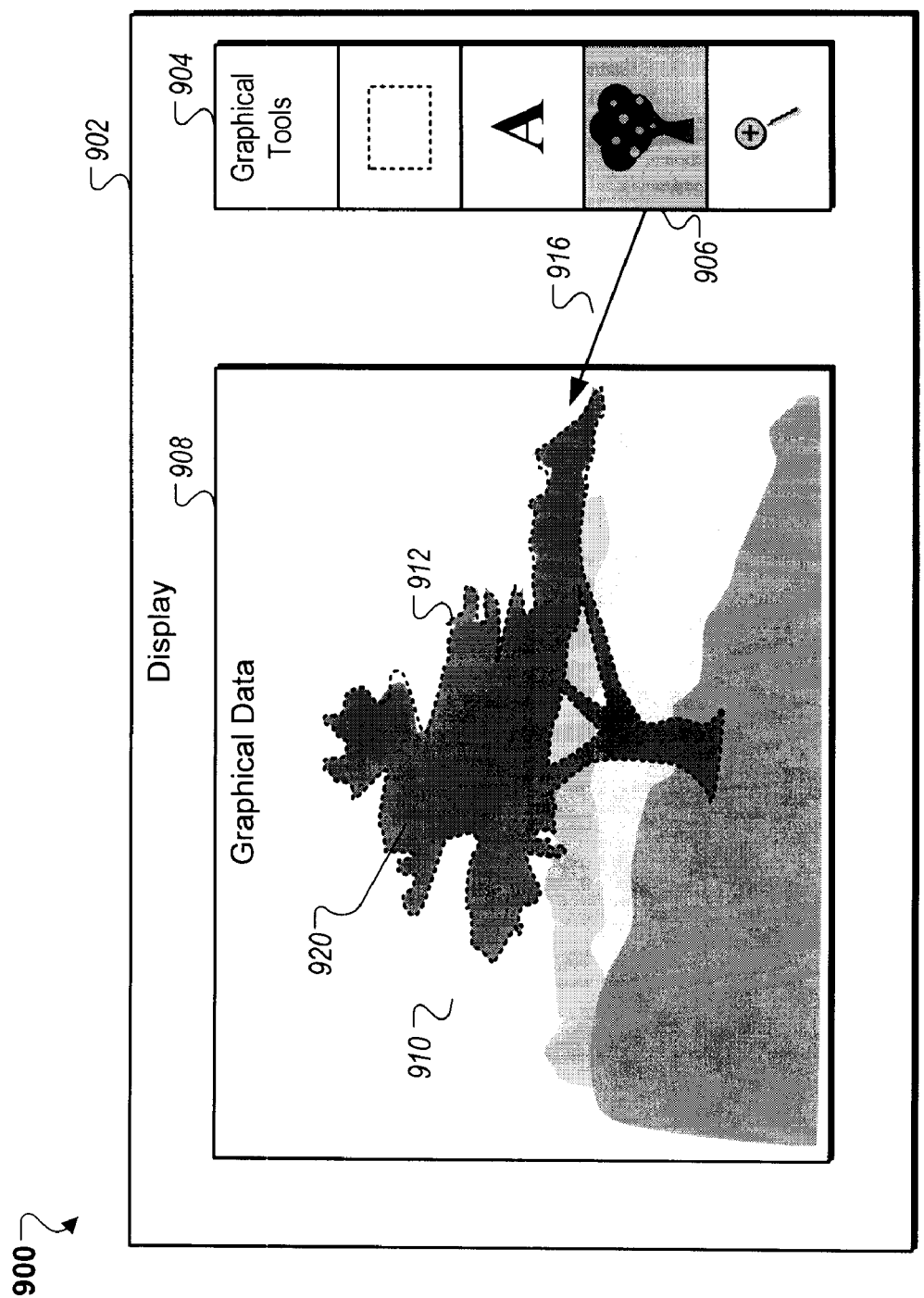
FIG. 9 is a block diagram showing an example display in which representation information is transformed.

FIG. 9 is a block diagram 900 showing an example display 902 in which representation information is transformed. In general, diagram 900 shows how representation information can be transformed when the representation information includes a copy of a region 912 of graphical data 908, selected as part of applying a tool 906.

As shown in FIG. 9, the display 902 includes graphical data 908 and a menu 904 of graphical tools. In the example display 902, the graphical data 908 includes a representation of a landscape 910. Through the menu 904 a user can select a graphical tool, such as a tree tool 906, for use in editing the graphical data 908. Graphical tools can include tools for selecting regions of the graphical data 908, as well as tools for performing operations on the graphical data 908.

In addition, use of a tool can result in selection of a region 912, and creation of a copy of the graphical data 908. The region 912 to be copied can be determined by the tool 906 applied, the location 920 relative to the graphical data 908 where the tool 906 is applied, and characteristics of the graphical data 908. For example, if the tree tool 906 is applied, as represented by the arrow 916, an image editor can determine that the region 912 to be selected for copying is tree-shaped or that brown and green colors should be emphasized in the selection. In addition, the editor can determine, based on the characteristics of the graphical data 908, where the edges of the tree represented by the graphical data 908 are. The starting point for edge determination can be based on the location 920, relative to the graphical data 908, where the tool 906 is applied.

Application of the tree tool 906, as represented by the arrow 916, can indicate that the graphical data 908 will be graphically modified. As a result of the anticipated graphical modification, a region 912 of the graphical data 908 can be selected and copied. Thus, the copy of the graphical data 908 can modified rather than the original data.

Implicitly, by using one of the graphical tools 904, a user can select a region 912 of the graphical data 908. The region 912 can be shaped like a rectangle, ellipse, or many other regular and irregular shapes. The region 912 can also include non-contiguous areas (i.e., separated by parts of the graphical data 908 not included in the region 912). In FIG. 9, the region 912 corresponds to a tree, and is shaped like the tree represented by the graphical data 908.

As shown in FIG. 9, the copy of the region 912 is overlaid on the graphical data 908. Overlaying the copy on the graphical data 908 can provide the appearance that the graphical data 908 has been modified.

The region 912 can be indicated visually relative to the graphical data 908. For example, the region 912 can include a dashed border (i.e., marching ants). The indication, as depicted in FIG. 9 relative to the region 912, can help a user to easily see what corresponds to the region 912 out of the graphical data 908. Alternatively, a visual indication of the region 912 need not be displayed. The user can be given the option of selectively displaying the indication.

Selecting the region 912 can limit the effect of the tool 906 to the graphical data 908. For example, given that region 912 corresponds to the tree, a darkening adjustment can apply to just the region 912, thus darkening the tree, rather than the remainder of the graphical data 908.

Figure 10A:
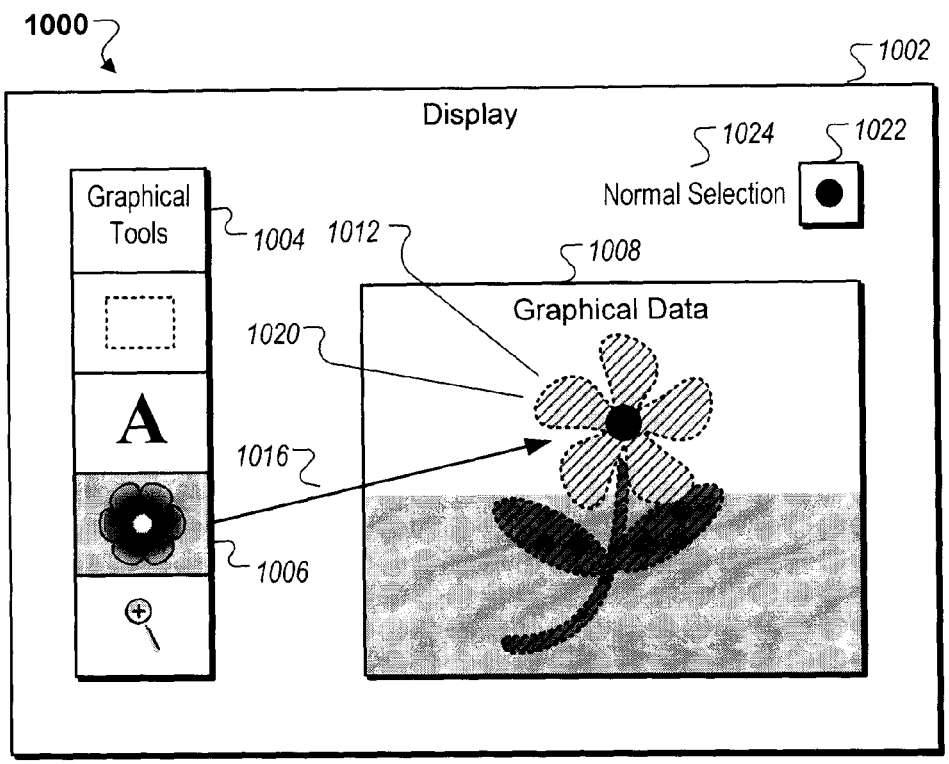
FIG. 10A is a block diagram showing an example display in which representation information is transformed.

FIG. 10A is a block diagram 1000 showing an example display 1002 in which representation information is transformed. In general, diagram 1000 shows use of a tool 1006 to both select and modify graphical data 1008 with respect to a visually depicted aspect 1012 of an image. When a user applies a tool 1006, the image editor can select a region 1020 based on the visually depicted aspect 1012, copy the region 1020, as part of the representation information, and apply a graphical tool 1006 to the copy.

As shown in FIG. 10A, the display 1002 includes graphical data 1008, a menu 1004 of graphical tools, and a selection-type option 1022. In the example display 1002, the graphical data 1008 includes a representation of a flower 1012. The menu 1004 can allow a user to select a graphical tool, such as a flower tool 1006, for use in editing the graphical data 1008. The selection-type option 1022 can allow a user to choose whether to select the visually depicted aspect 1012 to which the tool 1006 is applied or everything except the visually depicted aspect 1012.

The selection-type option 1022 can be provided using a toggle button, fly-out toolbar, drop-down menu, checkbox or various other user interface mechanisms. The example display 1002 shows with the text 1024 and selection-type option 1022 that selections will take place normally, i.e., the visually depicted aspect 1012 will be selected and modified.

Graphical tools can include tools for selecting regions of the graphical data 1008, as well as tools for performing operations on the graphical data 1008. In addition, use of a tool can result in selection of a region 1020, and creation of a copy of the graphical data 1008. Creating a copy to be modified can allow a user to make changes without altering the original graphical data 1008. Selecting the region 1020 can limit the effect of the tool 1006. The selection corresponding to region 1020 can be determined by algorithms based on the tool 1006 applied, the location relative to the graphical data 1008 where the tool 1006 is applied, and characteristics of the graphical data 1008.

For example, if the flower tool 1006 is applied, as represented by the arrow 1016, an image editor can determine that the region 1020 to be selected for copying is flower-shaped or that bright colors should be emphasized in the selection. Since application 1016 of the tool 1006 resulted in a region 1020 corresponding to the flower 1012, a saturation increasing adjustment can apply only to the region 1020, as represented by the pattern covering region 1020. Thus, the flower 1012 can appear more colorful while the remainder of the graphical data 1008 appears unchanged.

The region 1020 can be indicated visually relative to the graphical data 1008. For example, the region 1020 can include a marquee border (i.e., marching ants). The indication, as depicted in FIG. 10A relative to the region 1020, can help a user to easily see what corresponds to the region 1020 out of the graphical data 1008.

Figure 10B:
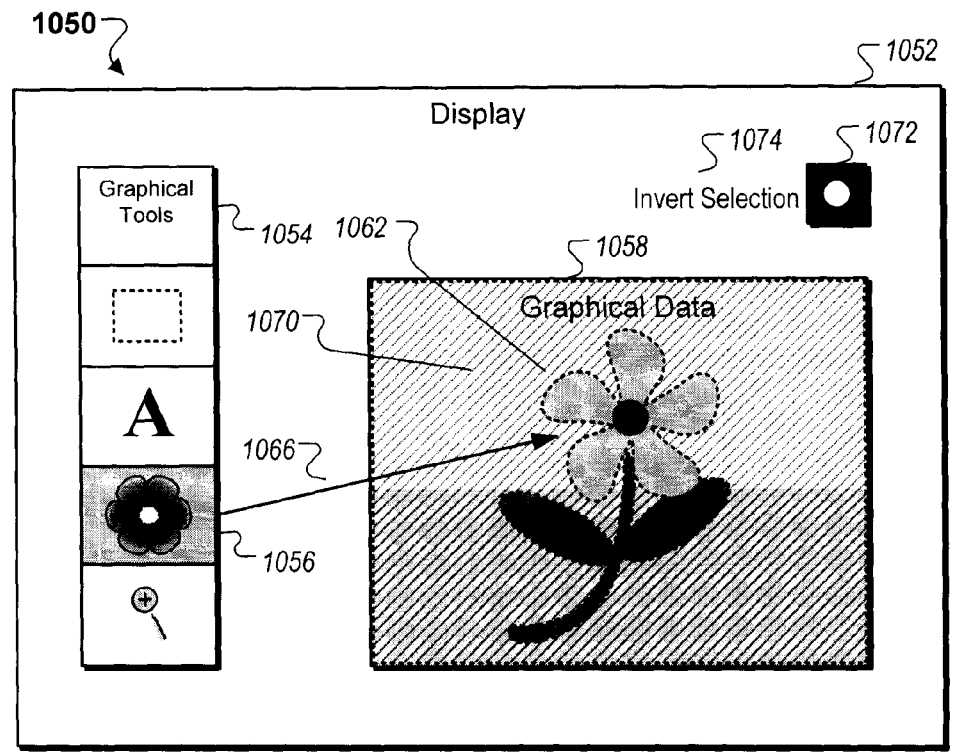
FIG. 10B is a block diagram showing an example display in which representation information is transformed.

FIG. 10B is a block diagram 1050 showing an example display 1052 in which representation information is transformed. In general, diagram 1050 shows use of a tool 1056 to both select and modify graphical data 1058 with respect to a visually depicted aspect 1062 of an image As shown in FIG. 10B, the display 1052 includes graphical data 1058, a menu 1054 of graphical tools, and a selection-type option 1072. In the example display 1052, the graphical data 1058 includes a representation of a flower 1062. The menu 1054 can allow a user to select a graphical tool, such as a flower tool 1056, for use in editing the graphical data 1058.

The selection-type option 1072 can allow a user to choose whether to select the visually depicted aspect 1062 to which the tool 1056 is applied or everything except the visually depicted aspect 1062. The example display 1052 shows with the text 1074 and selection-type option 1072 that selections will inverted, i.e., everything but the visually depicted aspect 1062 will be selected and modified. Additional selection options can also provided. For example, an option can indicate that the visually depicted aspect 1062 to which a tool 1056 is applied should not be selected, as with an inverted selection, but that the selection should include a portion of the remainder of the graphical data 1058, such as a portion corresponding to sky.

The selection corresponding to region 1070, in contrast to the region 1020, in FIG. 10A, does not include the flower 1062. If, for example, the flower tool 1056 is applied, as represented by the arrow 1066, an image editor can determine that the region 1070 to be selected is opposite that determined with respect to FIG. 10A. Since application 1066 of the tool 1056 resulted in a region 1070, a desaturating adjustment can apply to just the region 1070, as represented by the pattern covering region 1070. Thus, the flower 1062 can appear unchanged, while the region 1070, representing the remainder of the graphical data 1058, can appear black and white.

The region 1070 can include a marquee border around the outside of the flower 1062 and just inside the edges of graphical data 1058. The border can thus indicated that the flower 1062 is not included in the selection or corresponding region 1070.

Embodiments of the subject matter and all of the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. Computer program instructions, which are thus encoded (e.g., as physically stored binary data), are a tangible article of manufacture that defines structural and functional interrelationships between the computer program and other components of a data processing apparatus, which permits the functionality to be realized.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. Moreover, when functionality of one or more computer program products is realized through the data processing apparatus, the instructions transform physical aspects of the apparatus into a different state. For example, flip-flops, latches, transistor gates or capacitors included in a memory device can be transformed by the operation of the instructions to a different electronic state or level of electrical or magnetic charge.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method performed by a computer programmed to transform representation information, the method comprising:
   receiving a request to modify graphical data using a graphical tool, wherein the graphical data is associated with representation information, and the request indicates a visually depicted aspect of the graphical data;
   deriving an alteration of the representation information, based, at least in part, on the visually depicted aspect; and
   transforming the representation information based on the derived alteration.

2. The method of claim 1, wherein the deriving comprises deriving the alteration based on a parameter configured by an end user.

3. The method of claim 1, further comprising displaying the visually depicted aspect, and wherein the deriving the alteration comprises determining a zoom level for the displaying.

4. The method of claim 1, wherein the derived alteration comprises metadata describing the visually depicted aspect.

5. The method of claim 1, wherein the deriving comprises:
   creating a copy, included in the representation information, of a portion of the graphical data based on the received request; and
   deriving a graphical alteration of the copy.

6. The method of claim 5, wherein the deriving further comprises:
   selecting the portion of the graphical data based on the received request, including a location, relative to the graphical data, of the received request and the visually depicted aspect.

7. The method of claim 6, wherein the selected portion comprises the visually depicted aspect.

8. The method of claim 1, wherein the visually depicted aspect comprises a representation of a physical object.

9. The method of claim 1, wherein the visually depicted aspect comprises an appearance attribute of the graphical data.

10. A computer program product, tangibly encoded on a computer-readable medium, operable to cause data processing apparatus to perform operations comprising:
    receiving a request to modify graphical data using a graphical tool, wherein the graphical data is associated with representation information, and the request indicates a visually depicted aspect of the graphical data;
    deriving an alteration of the representation information, based, at least in part, on the visually depicted aspect; and
    transforming the representation information based on the derived alteration.

11. The computer program product of claim 10, wherein the deriving comprises deriving the alteration based on a parameter configured by an end user.

12. The computer program product of claim 10, the operations further comprising displaying the visually depicted aspect, and wherein the deriving the alteration comprises determining a zoom level for the displaying.

13. The computer program product of claim 10, wherein the derived alteration comprises metadata describing the visually depicted aspect.

14. The computer program product of claim 10, wherein the deriving comprises:
    creating a copy, included in the representation information, of a portion of the graphical data based on the received request; and
    deriving a graphical alteration of the copy.

15. The computer program product of claim 14, wherein the deriving further comprises:
    selecting the portion of the graphical data based on the received request, including a location, relative to the graphical data, of the received request and the visually depicted aspect.

16. The computer program product of claim 15, wherein the selected portion comprises the visually depicted aspect.

17. The computer program product of claim 10, wherein the visually depicted aspect comprises a representation of a physical object.

18. The computer program product of claim 10, wherein the visually depicted aspect comprises an appearance attribute of the graphical data.

19. A system comprising:
    a user interface device; and
    one or more computers operable to interact with the user interface device and to perform operations comprising:
    receiving a request to modify graphical data using a graphical tool, wherein the graphical data is associated with representation information, and the request indicates a visually depicted aspect of the graphical data;
    deriving an alteration of the representation information, based, at least in part, on the visually depicted aspect; and
    transforming the representation information based on the derived alteration.

20. The system of claim 19, wherein the deriving comprises deriving the alteration based on a parameter configured by an end user.

21. The system of claim 19, the operations further comprising displaying the visually depicted aspect, and wherein the deriving the alteration comprises determining a zoom level for the displaying.

22. The system of claim 19, wherein the derived alteration comprises metadata describing the visually depicted aspect.

23. The system of claim 19, wherein the deriving comprises:
creating a copy, included in the representation information, of a portion of the graphical data based on the received request; and
deriving a graphical alteration of the copy.

24. The system of claim 23, wherein the deriving further comprises:
selecting the portion of the graphical data based on the received request, including a location, relative to the graphical data, of the received request, and the visually depicted aspect.

25. The system of claim 24, wherein the selected portion comprises the visually depicted aspect.

26. The system of claim 19, wherein the visually depicted aspect comprises a representation of a physical object.

27. The system of claim 19, wherein the visually depicted aspect comprises an appearance attribute of the graphical data.

28. A method comprising:
executing instructions on a computing platform so that a request is received to modify graphical data using a graphical tool, wherein the graphical data is associated with representation information, and the request indicates a visually depicted aspect of the graphical data;
executing instructions on the computing platform so that an alteration of the representation information is derived, based, at least in part, on the visually depicted aspect; and
executing instructions on the computing platform so that the representation information is transformed based on the derived alteration.

* * * * *